United States Patent
Peyron et al.

(10) Patent No.: US 11,230,973 B2
(45) Date of Patent: Jan. 25, 2022

(54) HEAT-TRANSFER FLUID FOR A COOLING SYSTEM OF AN AIRCRAFT TURBOJET ENGINE

(71) Applicant: Safran Nacelles, Gonfreville L'Orcher (FR)

(72) Inventors: Vincent Peyron, Moissy Cramayel (FR); Jean-Nicolas Bouchout, Moissy Cramayel (FR)

(73) Assignee: Safran Nacelles, Gonfreville L'Orcher (FR)

( * ) Notice: Subject to any disclaimer, the term of this patent is extended or adjusted under 35 U.S.C. 154(b) by 57 days.

(21) Appl. No.: 16/839,118

(22) Filed: Apr. 3, 2020

(65) Prior Publication Data

US 2020/0362758 A1    Nov. 19, 2020

(30) Foreign Application Priority Data

Apr. 3, 2019 (FR) ...................................... 1903541

(51) Int. Cl.
*F02C 7/16* (2006.01)
*F02C 7/14* (2006.01)

(52) U.S. Cl.
CPC ................. *F02C 7/16* (2013.01); *F02C 7/14* (2013.01); *F05D 2260/213* (2013.01)

(58) Field of Classification Search
CPC ......... F02C 7/14; F02C 7/16; F05D 2260/213
See application file for complete search history.

(56) References Cited

U.S. PATENT DOCUMENTS

| 6,374,907 B1* | 4/2002 | Tousignant | C09K 5/10 165/80.4 |
| 8,789,377 B1* | 7/2014 | Brostmeyer | F02C 7/16 60/806 |
| 2010/0212857 A1* | 8/2010 | Bulin | F02C 7/14 165/41 |
| 2013/0306265 A1* | 11/2013 | Appukuttan | F02C 7/14 165/11.1 |
| 2014/0182264 A1* | 7/2014 | Weisgerber | F02C 7/16 60/39.19 |

(Continued)

FOREIGN PATENT DOCUMENTS

| DE | 102016219680 | 4/2018 |
| FR | 2914365 | 10/2008 |
| WO | 2018055307 | 3/2018 |

OTHER PUBLICATIONS 3M, 3M Novec 7500 Engineered Fluid product information pages, pp. 1-8.

(Continued)

*Primary Examiner* — Craig Kim
(74) *Attorney, Agent, or Firm* — Burris Law, PLLC

(57) ABSTRACT

In a cooling system of an aircraft turbojet engine surrounded by a nacelle, a heat-transfer fluid is circulated that is less flammable than a lubricant (H) for the turbojet engine and liquid at temperatures between −70° C. and +175° C., the heat-transfer fluid (C) being intended to circulate in a closed-circuit circulation duct including a first surface heat-exchanger between the heat-transfer fluid (C) and air (F), at the level of at least one of the outer fairing and the inner fairing of the nacelle, and a second surface heat-exchanger between the heat-transfer fluid (C) and the lubricant (H).

13 Claims, 2 Drawing Sheets

(56) References Cited

U.S. PATENT DOCUMENTS

| | | | |
|---|---|---|---|
| 2014/0345292 A1 | 11/2014 | Diaz et al. | |
| 2015/0192033 A1* | 7/2015 | Garassino | F01M 5/002 62/468 |
| 2016/0114898 A1* | 4/2016 | Llamas Castro | F02C 7/047 415/177 |
| 2017/0159569 A1* | 6/2017 | Miller | F02C 7/14 |
| 2018/0319726 A1* | 11/2018 | Mitsuoka | C09D 7/20 |
| 2019/0360401 A1* | 11/2019 | Rambo | F02C 7/14 |
| 2019/0390603 A1* | 12/2019 | Snyder | H05K 7/20309 |

OTHER PUBLICATIONS

Preliminary Search Report for French Application 1903541, dated Dec. 20, 2019.

* cited by examiner

HEAT-TRANSFER FLUID FOR A COOLING SYSTEM OF AN AIRCRAFT TURBOJET ENGINE

CROSS-REFERENCE TO RELATED APPLICATIONS

This application claims priority to and the benefit of FR 19/03541 filed on Apr. 3, 2019. The disclosure of the above application is incorporated herein by reference.

FIELD

The present disclosure relates to the field of fluids for cooling systems of aircraft turbojet engines.

BACKGROUND

The statements in this section merely provide background information related to the present disclosure and may not constitute prior art.

An aircraft is propelled by one or several propulsion unit(s) each comprising a turbojet engine housed within a nacelle. Each propulsion unit is attached to the aircraft by a mast generally located below or over a wing or at the level of the fuselage of the aircraft.

A turbojet engine may also be called an engine. In the following description, the terms engine and turbojet engine will be indifferently used.

A nacelle, generally, has a tubular structure comprising an upstream section comprising an air inlet upstream of the turbojet engine, a middle section intended to surround a fan of the turbojet engine, a downstream section adapted to accommodate thrust reversal means and intended to surround the combustion chamber of the turbojet engine, and generally terminates in an ejection conduit whose outlet is located downstream of the turbojet engine.

Furthermore, a nacelle usually comprises an outer structure comprising a fixed portion and a movable portion (thrust reversal means), and an inner fixed structure (IFS), concentric with the outer structure. The inner fixed structure surrounds the core of the turbojet engine at the rear of the fan. These outer and inner structures define an annular flow path, also called secondary flow path, intended to channel a so-called secondary cold air flow which circulates outside the turbojet engine.

The outer structure includes an outer fairing defining an outer aerodynamic surface, intended to be in contact with an outer air flow, and an inner fairing defining an inner aerodynamic surface, intended to be in contact with the secondary air flow. The inner and outer fairings are connected upstream by a leading-edge wall forming an air inlet lip.

In general, the turbojet engine comprises a set of blades (compressor and possibly fan or non-ducted propeller) driven in rotation by a gas generator through a set of transmission means.

A lubricant distribution system is provided in the turbojet engine to ensure a proper lubrication of these transmission means and cool them down. The lubricant consists of oil. In the following description, the terms lubricant and oil will be indifferently used.

A cooling system including a heat-exchanger allows cooling down the lubricant

For this purpose, a known method consists in cooling down the lubricant by circulation through an air/oil heat-exchanger using cold air from the secondary flow path (called cold flow) of the nacelle or from one of the first stages of the compressor, to cool down the oil of the turbojet engine. Such a heat-exchanger is a finned heat-exchanger. It includes fins in the cold air flow which disturb the flow of the air flow in the secondary flow path or in the compressor, which results in pressure drops (drag), and therefore in losses of performances for the aircraft in terms of fuel consumption (the FB (Fuel Burn) parameter).

Another known method consists in cooling down the lubricant thanks to a cooling system comprising an air/oil heat-exchanger using cold air collected from outside the nacelle or in the secondary flow path, by a scoop disposed respectively on the outer or inner fairing of the nacelle, the cold air being circulated through the heat-exchanger and adapted to serve for deicing of the nacelle, once heated up by the lubricant, by circulation in ducts disposed in contact with the walls of the outer structure of the nacelle, for example at the level of the air inlet lip. Such a system allows for a better control of the exchanged thermal energies, but the presence of scoops within the outer or inner fairing of the nacelle results in a loss of aerodynamic performances, in the same manner as a finned heat-exchanger, and therefore in losses of performances for the aircraft in terms of fuel consumption (the FB (Fuel Burn) parameter).

The presence of fins or scoops within the inner or outer fairing of the nacelle results in a loss of aerodynamic performances.

A known solution for limiting disturbances of the air flow, consists in providing a cooling system including a surface heat-exchanger between the lubricant and air. Such a cooling system includes a closed-circuit circulation duct of the lubricant. More particularly, the circulation duct of the lubricant includes a portion disposed within the nacelle in contact with the inner and/or outer fairing of the nacelle. Even more particularly, the portion disposed within the nacelle in contact with the inner and/or outer fairing of the nacelle includes a plurality of channels disposed in parallel, the channels being formed by a double-wall of the inner and/or outer fairing, this is then referred to as structural surface heat-exchanger.

The lubricant being flammable at temperatures in the range of 260° C., it is challenging to make it circulate along the inner or outer fairing assembly of the nacelle.

Indeed, some areas of the nacelle, called fire areas, are very sensitive to flames, because they contain flammable products and an ignition source. For example, some areas of the downstream section intended to surround the combustion chamber of the turbojet engine (called core compartment) are systematically considered as fire area, as well as possibly some areas of the middle section, intended to surround the fan of the turbojet engine (called fan areas).

Furthermore, since the lubricant is very viscous at low temperatures, a defrosting means is provided to make the lubricant circulate over some areas of the nacelle exposed to very low temperatures.

SUMMARY

This section provides a general summary of the disclosure and is not a comprehensive disclosure of its full scope or all of its features.

The present disclosure provides, in a cooling system of an aircraft turbojet engine, a heat-transfer fluid that is less flammable at temperatures in the range of 130° C., and less viscous at low temperature than a lubricant for the turbojet engine, the heat-transfer fluid being intended to circulate in contact with the outer fairing and/or the inner fairing of the nacelle in order to cool it down, and then in contact with the lubricant in order to cool down the lubricant.

To this end, the present disclosure provides the use, in a cooling system of an aircraft turbojet engine surrounded by a nacelle, of a heat-transfer fluid less flammable than a lubricant for the turbojet engine, and liquid at temperatures between −70° C. and +175° C., the heat-transfer fluid being intended to circulate in a closed-circuit circulation duct including a first surface heat-exchanger between the heat-transfer fluid and air, at the level of the outer fairing and/or the inner fairing of the nacelle, and a second surface heat-exchanger between the heat-transfer fluid and the lubricant.

By "less flammable than a lubricant," it should be understood that the heat-transfer fluid is flammable at higher temperatures than the lubricant. The lubricant being generally flammable at 260° C. (flash point), the heat-transfer fluid of the present disclosure is flammable at higher temperatures.

Thus, the assembly formed by the inner and outer fairings of the nacelle may be used for the circulation of the heat-transfer fluid, without any defrosting device.

Furthermore, the heat-transfer fluid may also circulate in the inner fixed structure of the nacelle.

The first heat-exchanger is called cold source heat-exchanger, whereas the second heat-exchanger is called hot source heat-exchanger.

According to one form of the present disclosure, the first surface heat-exchanger includes a plurality of channels disposed in parallel.

According to one feature of, the first heat-exchanger is formed at least partially by a double-wall of the inner fairing and/or the outer fairing of the nacelle.

According to another form of the present disclosure, the first heat-exchanger is formed at least partially by a double-wall of the inner fixed structure of the nacelle.

This is then referred to as structural surface heat-exchanger.

According to one form of the present disclosure, the heat-transfer fluid is nonflammable.

According to one feature of the present disclosure, the heat-transfer fluid is liquid at temperatures between −70° C. and +175° C. and at pressures lower than 10 bars.

According to another form of the present disclosure, the heat-transfer fluid has an ignition point higher than 260° C., a combustion point higher than 280° C. and an auto-ignition temperature higher than 400° C.

Thus, the heat-transfer fluid can circulate in the proximity of electrical equipment.

According to one form of the present disclosure, the heat-transfer fluid has a dielectric constant lower than 6.

According to other forms of the present disclosure, the heat-transfer fluid belongs to the hydrofluoroethers (HFE) family. In this manner, the heat-transfer fluid is adapted to remain in the liquid state at temperatures lower than 130° C. at atmospheric pressure, and therefore throughout the entirety of the nacelle.

According to another form of the present disclosure, the heat-transfer fluid belongs to the silicate esters family.

According to yet another form of the present disclosure, the heat-transfer fluid is a 3-Ethoxyperfluoro(2-methylhexane) such as one sold under the trademark NOVEC, e.g. NOVEC™ 7500 Engineered Fluid.

According to one form of the present disclosure, the circulation duct of the heat-transfer fluid includes a device for regulating the volume occupied by the heat-transfer fluid in the circulation duct of the heat-transfer fluid, which in one form includes an expansion vessel.

Thus, the heat-transfer fluid can be used at temperatures higher than its boiling point at atmospheric pressure.

The expansion vessel comprises a closed tank. Thus, the pressure in the expansion vessel is directly related to the volume occupied by the heat-transfer fluid in the expansion vessel. This feature advantageously allows controlling a maximum and/or minimum pressure in some portions of the circulation duct of the heat-transfer fluid by only tuning the capacity (volume) of the tank.

The present disclosure further concerns a cooling system of an aircraft turbojet engine surrounded by a nacelle, comprising: a first surface heat-exchanger between a heat-transfer fluid as previously described and air, a second surface heat-exchanger between the heat-transfer fluid and the lubricant, and a closed-circuit circulation duct of the heat-transfer fluid.

According to one feature of the present disclosure, the first surface heat-exchanger includes a plurality of channels disposed in parallel.

According to another form of the present disclosure, the first heat-exchanger is formed at least partially by a double-wall of the inner and/or the outer fairing of the nacelle.

According to one form of the present disclosure, the first heat-exchanger is formed at least partially by a double-wall of the inner fixed structure of the nacelle.

This is then referred to as structural surface heat-exchanger.

According to yet another form of the present disclosure, the cooling system includes several first surface heat-exchangers.

According to this form of the present disclosure, the first surface heat-exchangers are formed at least partially by a double-wall of the inner fairing and/or of the outer fairing and/or of the inner fixed structure of the nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
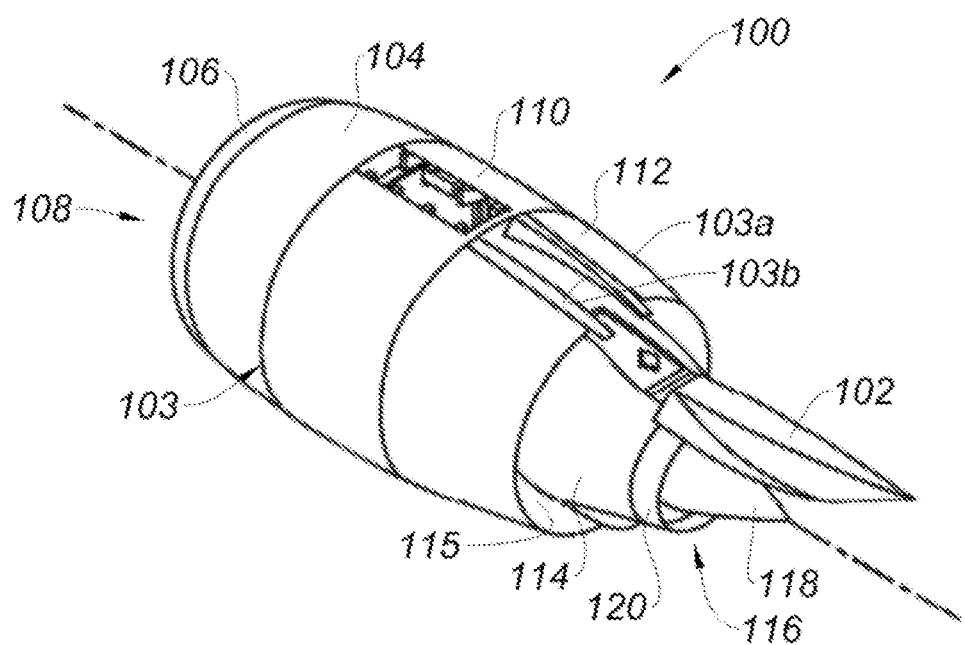
FIG. 1 is a schematic view of a nacelle comprising a cooling system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description and in the claims, identical, similar or analogous components will be referred to by the same reference numerals and the terms "upstream," "downstream," "upper," "lower," etc. will be used in a non-limiting manner and with reference to the drawings in order to facilitate the description.

FIG. 1 illustrates a nacelle 100 hanging from a pylon 102 intended to be fastened to a wing (not shown) of an aircraft (not shown). The nacelle 100 comprises an outer structure 103 comprising an upstream section 104 provided with a lip 106 forming an air inlet 108, a middle section 110, and a downstream section 112.

The nacelle further comprises an inner fixed structure 114 surrounding a downstream portion of a turbojet engine (not shown) concentrically with respect to the downstream section 112. The inner fixed structure 114 and the outer structure 103 delimit an annular flow path 115 defining a passage for a secondary cold air flow (not shown).

The nacelle 100 also comprises an ejection conduit 116 comprising a gas ejection plug 118 and a gas ejection nozzle 120. The ejection plug 118 and the ejection nozzle 120 define a passage for a hot air flow (not shown) coming out of the turbojet engine (not shown).

The outer structure 103 includes an outer fairing 103a defining an outer aerodynamic surface, and an inner fairing 103b defining an inner aerodynamic surface, the outer 103a and inner 103b fairings being connected upstream by a leading-edge wall (not shown) forming the air inlet 108 lip 106.

Figure 2:
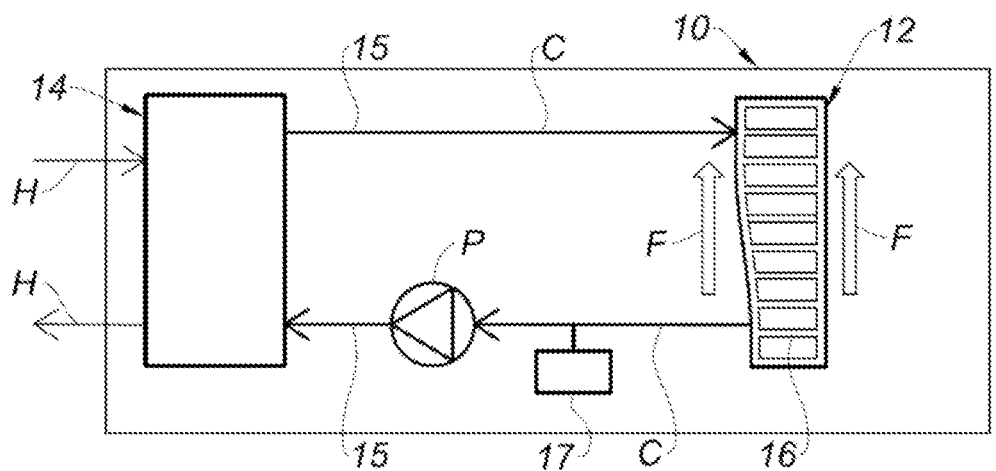
FIG. 2 is a schematic view of a cooling system comprising a heat-transfer fluid according to the present disclosure.

The nacelle comprises a so-called cold source surface heat-exchanger 12 (FIG. 2) between a heat-transfer fluid C (FIG. 2) to be cooled down and a cold air flow F (FIG. 2).

The cold air flow F may be the secondary air flow or an outside air flow.

The cold source surface heat-exchanger 12 is disposed within the outer structure 103. It is intended to cooperate with a so-called hot source heat-exchanger 14 (FIG. 2) between a lubricant H (FIG. 2) for a turbojet engine to be cooled down and the heat-transfer fluid C via a circulation duct 15 (FIG. 2) of the heat-transfer fluid C.

For example, the hot source heat-exchanger 14 may be disposed within the turbojet engine (not shown).

The assembly formed by the cold source surface heat-exchanger 12 and the hot source heat-exchanger 14 forms a cooling system 10 (FIG. 2) of the turbojet engine.

FIG. 2 illustrates the cooling system 10 of the turbojet engine.

The cooling system 10 comprises the cold source surface heat-exchanger 12 and the hot source heat-exchanger 14.

The heat-transfer fluid C circulates in the circulation duct 15 and in the cold source surface heat-exchanger 12 where it is cooled down by cold air F. The heat-transfer fluid C thus cooled down then circulates in the hot source heat-exchanger 14 where it is heated up by the lubricant H.

Thus, the heat-transfer fluid C cooled down by the cold source surface heat-exchanger allows cooling down the lubricant H.

The heat-transfer fluid C is intended to circulate both in the cold source surface heat-exchanger 12 and in the hot source heat-exchanger 14.

The heat-transfer fluid C in one form is a 3-Ethoxyperfluoro(2-methylhexane) which is sold under the trademark NOVEC, e.g. NOVEC™ 7500 Engineered Fluid. It belongs to the hydrofluoroethers (HFE) family.

The heat-transfer fluid is nonflammable, and liquid at temperatures between −70° C. and +175° C. and at pressures lower than 10 bars. It has an ignition point higher than 260° C., a combustion point higher than 280° C. and an auto-ignition temperature higher than 400° C. It further has a dielectric constant lower than 6.

A pump P enables the circulation of the heat-transfer fluid C between the cold source surface heat-exchanger 10 and the hot source heat-exchanger 14.

An expansion vessel 17 allows defining a maximum and/or minimum pressure in some portions of the circulation duct 15 of the heat-transfer fluid C. The expansion vessel 17 is closed so that its volume is related to the pressure of the circulation duct 15 of the heat-transfer fluid C. It is filled with the heat-transfer fluid C and with a volume devoid of heat-transfer fluid, called gaseous sky, which serves as a buffer. It allows limiting the pressure in the circulation duct 15 of the heat-transfer fluid during the expansion of the heat-transfer fluid according to the temperature.

The expansion vessel 17 is a device for regulating the volume occupied by the heat-transfer fluid C in the circulation duct 15 of the heat-transfer fluid.

Figure 3:
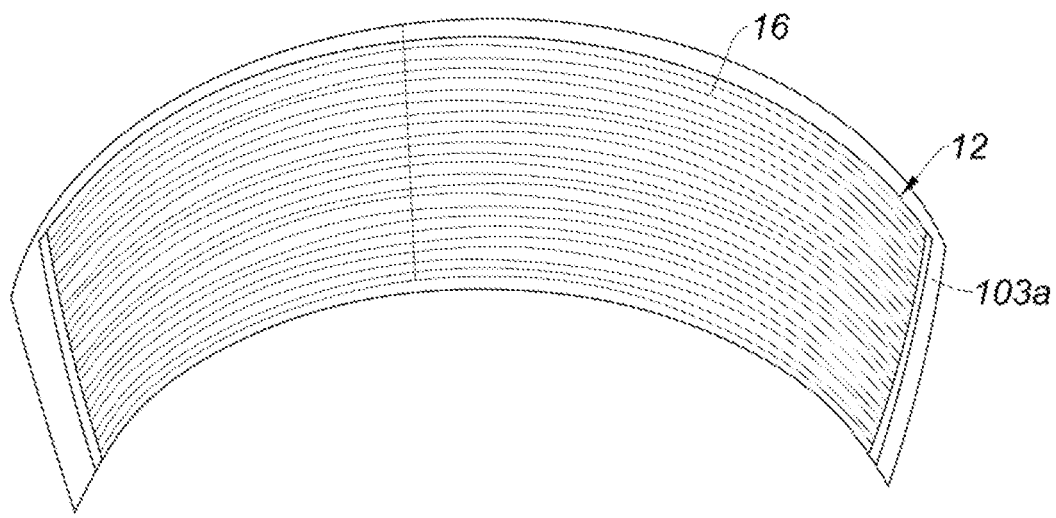
FIG. 3 is a schematic view of the outer fairing of the nacelle of FIG. 1, including a surface heat-exchanger between the heat-transfer fluid according to the present disclosure and air.

FIG. 3 illustrates the outer fairing 103a at the level of the downstream section 112 of a nacelle 100 (FIG. 1) including a cold source surface heat-exchanger 12.

The cold source surface heat-exchanger 12 comprises a plurality of channels 16 disposed in parallel, in which the heat-transfer fluid C circulates. The channels 16 are disposed in contact with the outer fairing 103a. They are formed by a double-wall of the outer fairing 103a of the nacelle. This is then referred to as structural surface heat-exchanger.

The outer fairing 103a being in contact with a cold outside air flow, the heat exchange is carried out by convection with the cold outside air flow.

In a variant that is not shown, the cold source surface heat-exchanger 12 is disposed in contact with the inner fairing 103b and the heat exchange is carried out by convection with the secondary cold air flow.

In a variation that is not shown, the cold source surface heat-exchanger 12 is disposed in contact with the outer fairing 103a and with the inner fairing 103b and the heat exchange is carried out by convection with the cold outside air flow and the secondary cold air flow.

Figure 4:
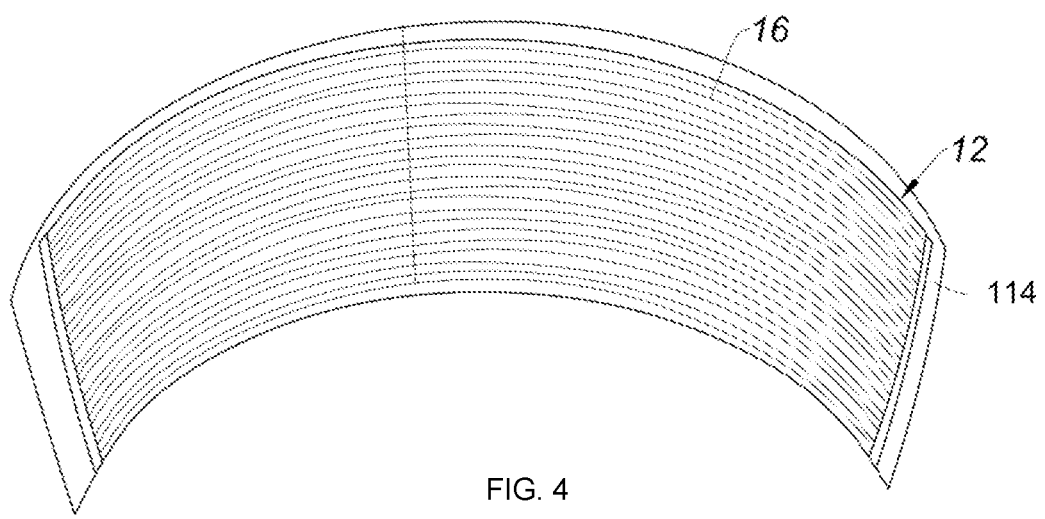
FIG. 4 is a schematic view of a portion of the inner fixed structure of the nacelle of FIG. 1, including a surface heat-exchanger between the heat-transfer fluid according to the present disclosure and air.

FIG. 4 illustrates a portion of the inner fixed structure 114 of a nacelle 100 (FIG. 1) including a cold source surface heat-exchanger 12 as described with reference to FIG. 3.

The inner fixed structure 114 is in contact with the secondary air flow. Hence, the heat exchange is carried out by convection with the secondary air flow.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method, in a cooling system of an aircraft turbojet engine surrounded by a nacelle, comprising circulating a heat-transfer fluid less flammable than a turbojet engine lubricant, the heat-transfer fluid being liquid at temperatures between −70° C. and +175° C., the heat-transfer fluid circulating in a closed-circuit circulation duct comprising a first surface heat-exchanger between the heat-transfer fluid and air, the first surface heat-exchanger being disposed within range of at least one of an outer fairing and an inner fairing of the nacelle, and a second surface heat-exchanger between the heat-transfer fluid and the turbojet engine lubricant.

2. The method according to claim 1, wherein the first surface heat-exchanger comprises a plurality of channels disposed in parallel.

3. The method according to claim 1, wherein the first surface heat-exchanger is formed at least partially by a double-wall of at least one of the inner fairing and the outer fairing of the nacelle.

4. The method according to claim 1, wherein the first surface heat-exchanger is formed at least partially by a double-wall of an inner fixed structure of the nacelle.

5. The method according to claim 1, wherein the heat-transfer fluid is nonflammable.

6. The method according to claim 1, wherein the heat-transfer fluid is liquid at temperatures between −70° C. and +175° C. and at pressures lower than 10 bars.

7. The method according to claim 1, wherein the heat-transfer fluid has an ignition point higher than 260° C., a combustion point higher than 280° C. and an auto-ignition temperature higher than 300° C.

8. The method according to claim 1, wherein the heat-transfer fluid is a hydrofluoroether (HFE) or a silicate ester.

9. The fluid according to claim 1, wherein the heat-transfer fluid is a 3-Ethoxyperfluoro(2-methylhexane).

10. A cooling system of an aircraft turbojet engine, the aircraft turbojet engine being surrounded by a nacelle, wherein the cooling system comprises:
a first surface heat-exchanger between a heat-transfer fluid and air, wherein the heat-transfer fluid is less flammable than a turbojet engine lubricant, and the heat-transfer fluid is liquid at temperatures between −70° C. and +175° C.;
a second surface heat-exchanger between the heat-transfer fluid and a turbojet engine lubricant; and
a closed-circuit circulation duct of the heat-transfer fluid.

11. The cooling system according to claim 10, wherein the first surface heat-exchanger includes a plurality of channels disposed in parallel.

12. The cooling system according to claim 10, wherein the first surface heat-exchanger is formed at least partially by a double-wall of at least one of an inner and an outer fairing of the nacelle.

13. The cooling system according to claim 10, wherein the first surface heat-exchanger is formed at least partially by a double-wall of an inner fixed structure of the nacelle.

* * * * *